US011216902B2

(12) United States Patent
Tazoe et al.

(10) Patent No.: US 11,216,902 B2
(45) Date of Patent: Jan. 4, 2022

(54) MOVING OBJECT ACTION REGISTRATION APPARATUS, MOVING OBJECT ACTION REGISTRATION SYSTEM, AND MOVING OBJECT ACTION DETERMINATION APPARATUS

(71) Applicant: Kabushiki Kaisha Toshiba, Tokyo (JP)

(72) Inventors: Yusuke Tazoe, Tokyo (JP); Tomoki Watanabe, Tokyo (JP); Akihito Seki, Yokohama Kanagawa (JP); Ryo Nakashima, Kawasaki Kanagawa (JP); Takuya Miyamoto, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 142 days.

(21) Appl. No.: 16/554,483

(22) Filed: Aug. 28, 2019

(65) Prior Publication Data

US 2020/0294176 A1    Sep. 17, 2020

(30) Foreign Application Priority Data

Mar. 14, 2019    (JP) .............................. JP2019-047372

(51) Int. Cl.
*G06T 1/00*    (2006.01)
*G06T 7/73*    (2017.01)
(Continued)

(52) U.S. Cl.
CPC ............ *G06T 1/0014* (2013.01); *G06F 16/51* (2019.01); *G06F 16/587* (2019.01);
(Continued)

(58) Field of Classification Search
CPC ...... G06K 9/46; G06K 9/00791; G06F 16/51; G06F 16/587; G06T 7/248; G06T 1/0014; G06T 7/74

See application file for complete search history.

(56) References Cited

U.S. PATENT DOCUMENTS 10,419,673 B2 *  9/2019  Makita ..................... H04N 1/00
10,463,447 B2 * 11/2019  Sela ......................... G06T 7/74
(Continued)

FOREIGN PATENT DOCUMENTS

JP    H 11272328 A    10/1999
JP    2004/030445    1/2004
(Continued)

*Primary Examiner* — Mia M Thomas
(74) *Attorney, Agent, or Firm* — Knobbe, Martens, Olson & Bear LLP

(57) ABSTRACT

According to one embodiment, a moving object action registration apparatus includes the following units. The acquisition unit acquires at least one reference image including a first reference image including a marker. The landmark detection unit detects, as a landmark, a feature point indicating a characteristic portion in an environment based on the at least one reference image. The marker detection unit detects the marker based on the first reference image. The calculation unit calculates a relative position between the landmark and the marker. The attribute identification unit identifies an attribute of the marker associated with an action. The registration unit registers the relative position and action information being based on the attribute in a database.

10 Claims, 10 Drawing Sheets

(51) Int. Cl.
*G06T 7/246* (2017.01)
*G06K 9/00* (2006.01)
*G06K 9/46* (2006.01)
*G06F 16/587* (2019.01)
*G06F 16/51* (2019.01)

(52) U.S. Cl.
CPC .......... *G06K 9/00791* (2013.01); *G06K 9/46* (2013.01); *G06T 7/248* (2017.01); *G06T 7/74* (2017.01); *G06K 2209/21* (2013.01); *G06T 2207/10016* (2013.01); *G06T 2207/30204* (2013.01); *G06T 2207/30252* (2013.01)

(56) References Cited

U.S. PATENT DOCUMENTS

| | | | | |
|---|---|---|---|---|
| 10,606,886 | B2* | 3/2020 | Li | G06F 16/5866 |
| 2008/0212871 | A1* | 9/2008 | Dohmen | G06T 7/564 |
| | | | | 382/154 |
| 2010/0039506 | A1* | 2/2010 | Sarvestani | A61B 34/20 |
| | | | | 348/65 |
| 2010/0104256 | A1* | 4/2010 | Tsurumi | G06K 9/00308 |
| | | | | 386/241 |
| 2010/0322475 | A1* | 12/2010 | Ikeda | G06T 7/254 |
| | | | | 382/103 |
| 2011/0170784 | A1* | 7/2011 | Tanaka | G06T 7/33 |
| | | | | 382/195 |
| 2012/0039511 | A1* | 2/2012 | Oi | G06T 7/70 |
| | | | | 382/103 |
| 2012/0213443 | A1* | 8/2012 | Shin | G05D 1/0274 |
| | | | | 382/190 |
| 2013/0188826 | A1* | 7/2013 | Nishino | G06T 7/215 |
| | | | | 382/103 |
| 2014/0193032 | A1* | 7/2014 | Zhang | G06T 3/0012 |
| | | | | 382/103 |
| 2016/0343147 | A1* | 11/2016 | Nukaga | G06K 9/4671 |
| 2017/0069100 | A1* | 3/2017 | Chiba | G06K 9/4652 |
| 2017/0289453 | A1* | 10/2017 | Makita | G01S 3/00 |
| 2018/0081908 | A1* | 3/2018 | Matsubara | G06T 7/248 |
| 2018/0137346 | A1* | 5/2018 | Mori | G06K 9/00342 |
| 2018/0185113 | A1* | 7/2018 | Gregerson | A61B 6/032 |
| 2018/0225540 | A1* | 8/2018 | Ell | G06T 7/277 |
| 2019/0147601 | A1* | 5/2019 | Kakuko | G06T 7/74 |
| | | | | 382/103 |
| 2020/0019809 | A1* | 1/2020 | Guigues | G06K 9/6212 |
| 2020/0294176 | A1* | 9/2020 | Tazoe | G06F 16/51 |

FOREIGN PATENT DOCUMENTS

| | | |
|---|---|---|
| JP | 5158162 | 3/2012 |
| JP | 5803119 | 8/2012 |
| JP | 2015149013 A | 8/2015 |

* cited by examiner

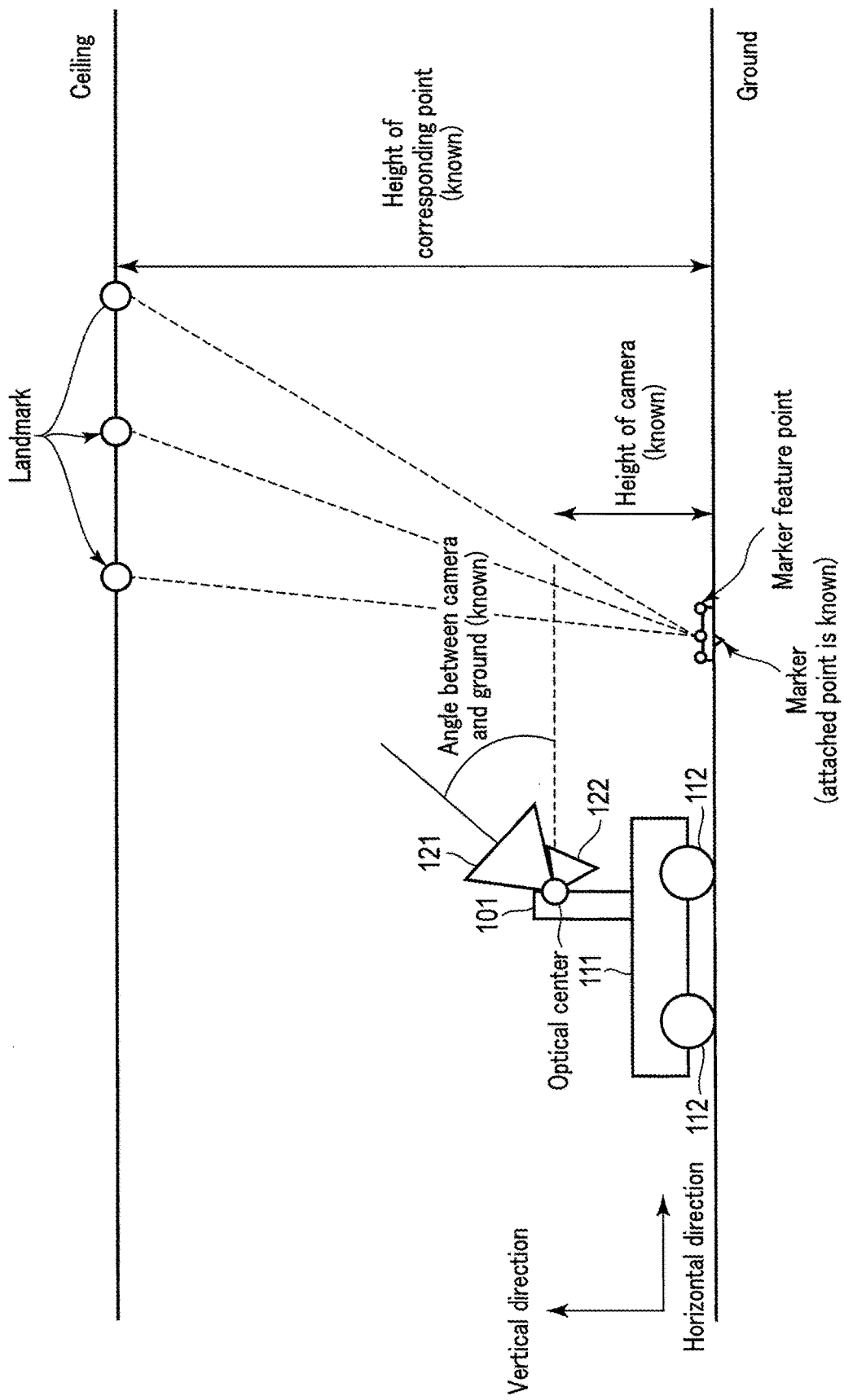
F I G. 2

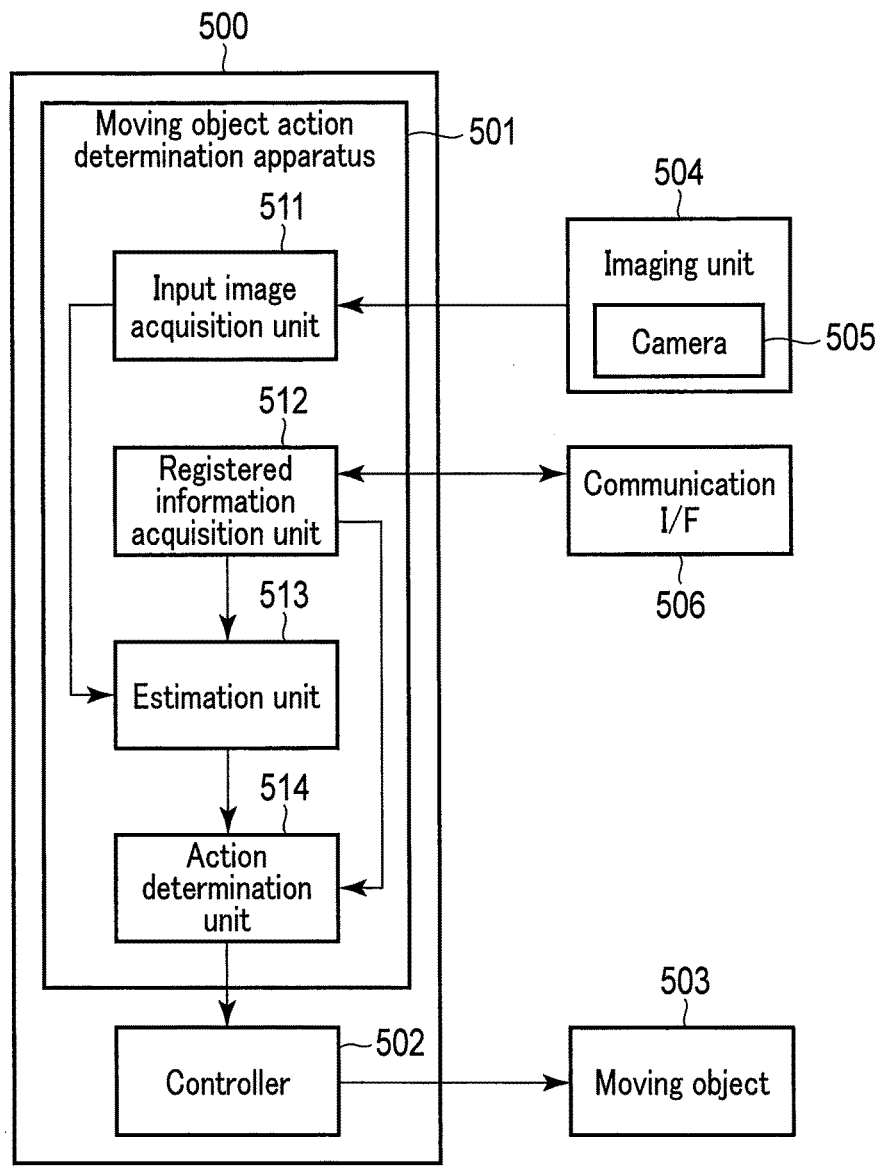
F I G. 5

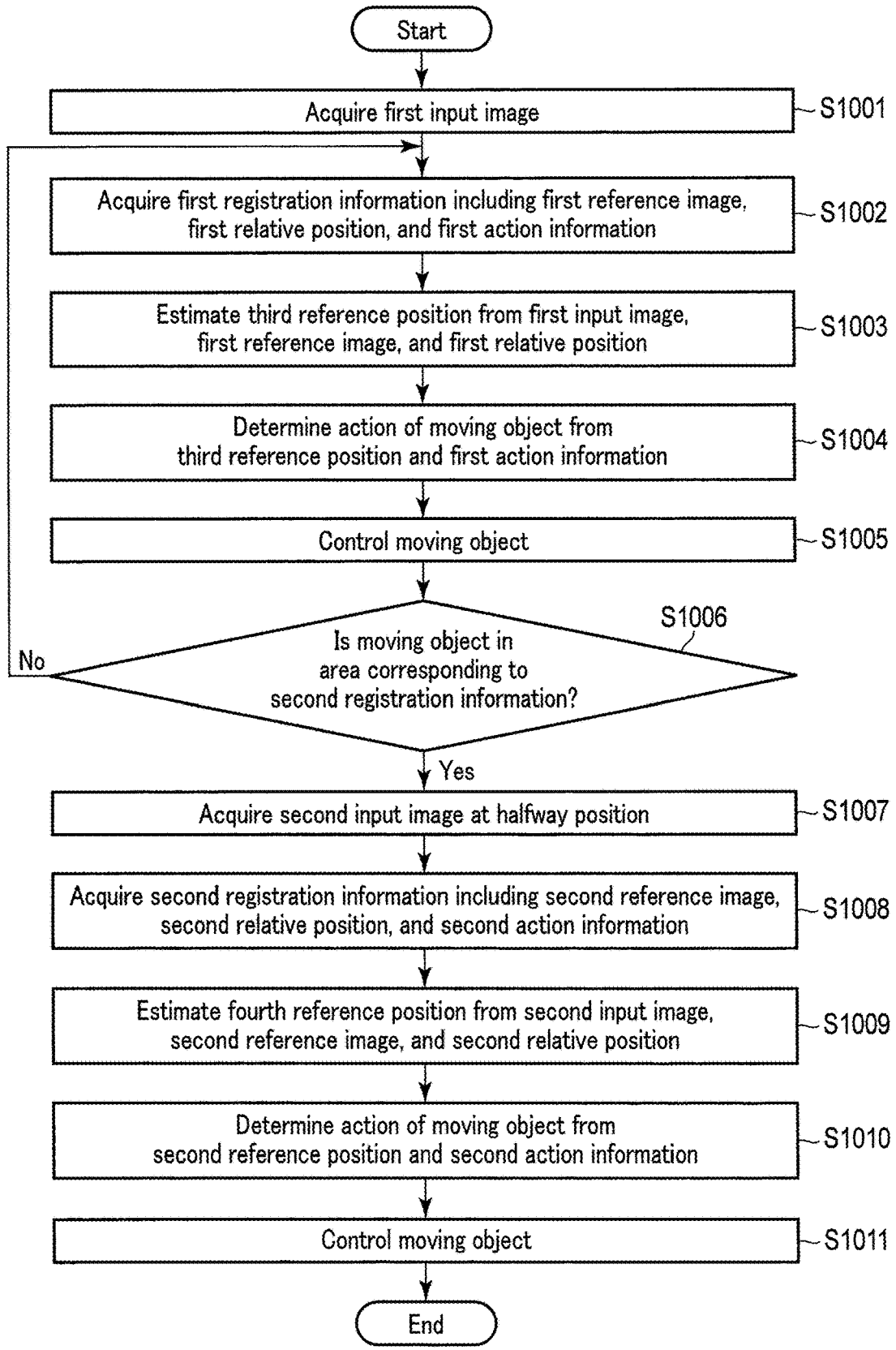
F I G. 10

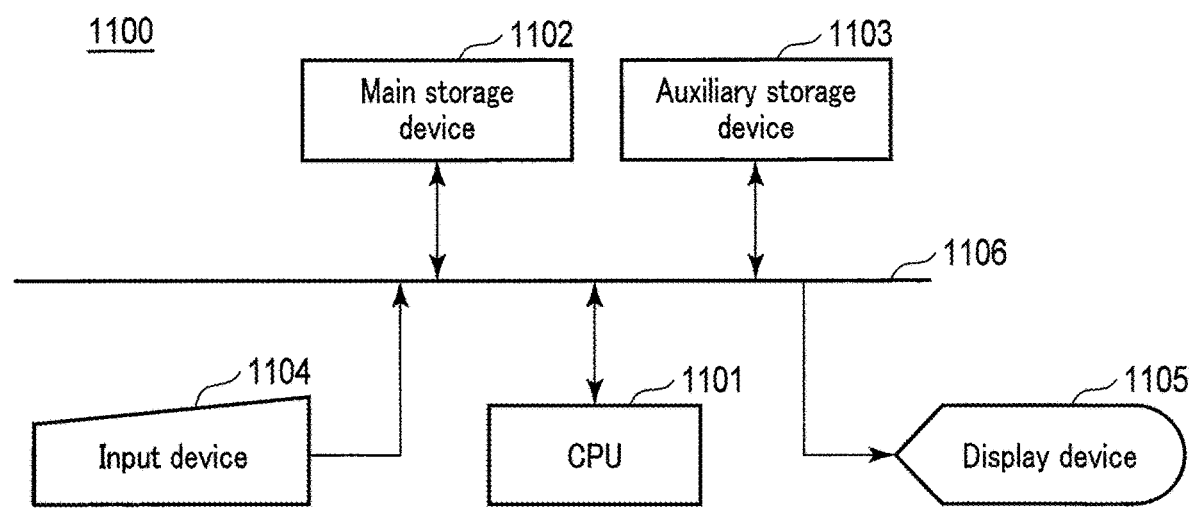
F I G. 11

MOVING OBJECT ACTION REGISTRATION APPARATUS, MOVING OBJECT ACTION REGISTRATION SYSTEM, AND MOVING OBJECT ACTION DETERMINATION APPARATUS

CROSS-REFERENCE TO RELATED APPLICATIONS

This application is based upon and claims the benefit of priority from Japanese Patent Application No. 2019-047372, filed Mar. 14, 2019, the entire contents of which are incorporated herein by reference.

FIELD

Embodiments described herein relate generally to a moving object action registration apparatus, a moving object action registration system, and a moving object action determination apparatus.

BACKGROUND

There is a mobile robot provided with a self-position estimation apparatus that estimates a self-position of the mobile robot based on an image captured by a camera installed on the mobile robot. The self-position estimation apparatus estimates a self-position of a mobile robot by using a marker (for example, an augmented reality (AR) marker) artificially installed in the environment or a landmark (for example, a place, such as a corner of a building, where brightness is different from the surroundings) whose position, posture, and shape are known existing in the environment. When self-position estimation is performed by using a landmark whose position, posture, and shape are known, there is an advantage that it is not necessary to set a marker.

For a mobile robot, it is necessary to determine in advance an action up to a target point or an action upon reaching the target point.

BRIEF DESCRIPTION OF THE DRAWINGS

FIG. 2 is a side view showing an appearance of the moving object action registration system shown in FIG. 1;

FIG. 5 is a block diagram showing a moving object control device according to a second embodiment;

FIG. 10 is a flowchart showing a processing procedure of the moving object control device shown in FIG. 9; and FIG. 11 is a block diagram showing a hardware configuration of a data processing device according to an embodiment.

DETAILED DESCRIPTION

According to one embodiment, a moving object action registration apparatus includes a reference image acquisition unit, a landmark detection unit, a marker detection unit, a relative position calculation unit, an attribute identification unit, and a registration unit. The reference image acquisition unit acquires at least one reference image from an imaging unit, the at least one reference image including a first reference image including a marker. The landmark detection unit detects, as a landmark, a feature point indicating a characteristic portion in an environment based on the at least one reference image. The marker detection unit detects the marker based on the first reference image. The relative position calculation unit calculates a relative position between the landmark and the marker based on a detection result of the landmark and a detection result of the marker. The attribute identification unit identifies an attribute of the marker associated with an action based on the first reference image. The registration unit registers registration information in a database, the registration information including the relative position and action information being based on the attribute.

Hereinafter, embodiments will be described with reference to the accompanying drawings.

First Embodiment

In a first embodiment, a moving object action registration system will be described which is used to determine an action procedure of a moving object capable of estimating a self-position based on an image captured by an imaging device. The self-position includes a position (for example, a three-dimensional position) and a posture (also referred to as an orientation). The moving object may be a moving object that autonomously moves from a departure point to a target point. The moving object is, for example, an automobile, a mobile robot, or the like.

Figure 1:
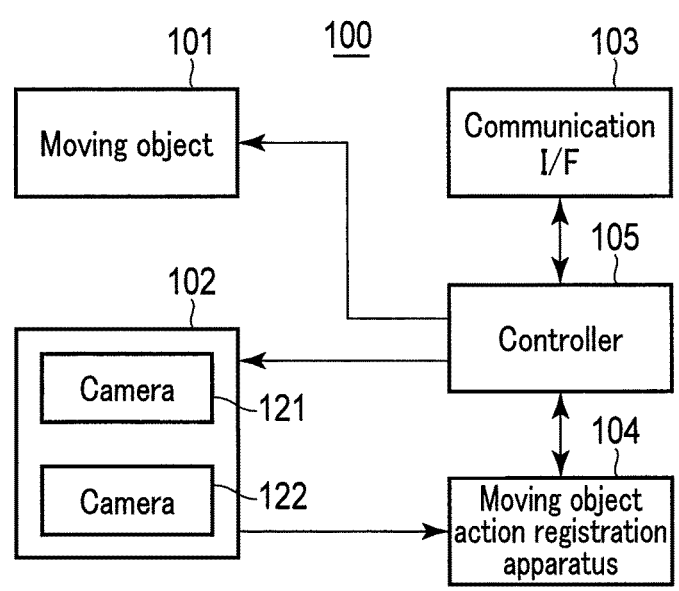
FIG. 1 is a block diagram showing a moving object action registration system according to a first embodiment.

FIG. 1 is a block diagram schematically showing a moving object action registration system 100 according to the first embodiment, and FIG. 2 is a side view schematically showing an appearance of the moving object action registration system 100. As shown in FIG. 1, the moving object action registration system 100 includes a moving object 101, an imaging unit 102, a communication interface 103, a moving object action registration apparatus 104, and a controller 105. The controller 105 controls the moving object 101, the imaging unit 102, the communication interface 103, and the moving object action registration apparatus 104.

In an example shown in FIG. 2, the moving object 101 is a robot including a body 111, wheels 112, and a drive mechanism (not shown) which drives the wheels 112. Alternatively, the moving object 101 may be a walking robot. The moving object 101 moves under the control of the controller 105. The communication interface 103, the moving object action registration apparatus 104, and the controller 105 are provided in the body 111 of the moving object 101.

The imaging unit 102 includes at least one imaging device attached to the body 111 of the moving object 101. In the present embodiment, the imaging unit 102 includes cameras 121 and 122 as imaging devices. The camera 121 is provided on the moving object 101 to face obliquely upward so as to be able to capture an image including a ceiling. The camera 122 is provided on the moving object 101 to face obliquely downward so as to be able to capture an image including a marker placed on the ground. The marker may be installed at any place (for example, a wall).

The marker is artificially installed in the environment. The marker is given an attribute associated with an action. Examples of the attribute include the orientation, position, pattern, color, shape, identification information (ID), size, blinking, and light emission of the marker. Data indicating a correspondence relationship between the attributes and the actions may be held by the moving object action registration apparatus 104 or may be stored in an external storage device. Examples of the action include the orientation of the moving object, the moving direction of the moving object, the velocity of the moving object, and an instruction to a device (mechanism) mounted on the moving object. For example, a green marker is associated with deceleration to a predetermined speed, and a red marker is associated with a change in movement direction to a predetermined direction. The attribute may be associated with information indicating a position where the action should be performed, in addition to the content of the action.

It is assumed that an angle formed by an optical axis of the camera 121 and the ground and an angle formed by an optical axis of the camera 122 and the ground are known. Further, it is assumed that a height of an optical center of the camera 121 (a distance between the ground and the optical center of the camera 121) and a height of an optical center of the camera 122 (a distance between the ground and the optical center of the camera 122) are known.

The cameras 121 and 122 may be monocular cameras, stereo cameras, or fish-eye cameras. Further, the images captured by the cameras 121 and 122 may be RGB three-channel images or may be one-channel images represented in grayscale.

Referring to FIG. 1, the communication interface 103 includes, for example, a wireless module, such as a wireless local area network (LAN) module, and performs wireless communication with an external device. For example, the communication interface 103 receives an instruction signal instructing movement of the moving object 101 from an external device used by an operator, and passes the instruction signal to the controller 105. The controller 105 controls movement of the moving object in accordance with the instruction signal received from the communication interface 103. Note that the communication interface 103 may be provided with a terminal, such as a LAN terminal or a universal serial bus (USB) terminal instead of a wireless module, and may perform wired communication with an external device.

The moving object action registration apparatus 104 receives at least one image including an image including a marker from the imaging unit 102 as a reference image. In the present embodiment, the moving object action registration apparatus 104 receives, from the imaging unit 102, a reference image captured by the camera 121 and a reference image including a marker captured by the camera 122. The moving object action registration apparatus 104 generates registration information for determining an action procedure of the moving object (which may be different from the moving object 101) based on the reference image received from the imaging unit 102, and registers the generated registration information in a database (not shown). In a case where the database exists outside the moving object action registration system 100, registration is performed via the controller 105 and the communication interface 103.

Figure 3:
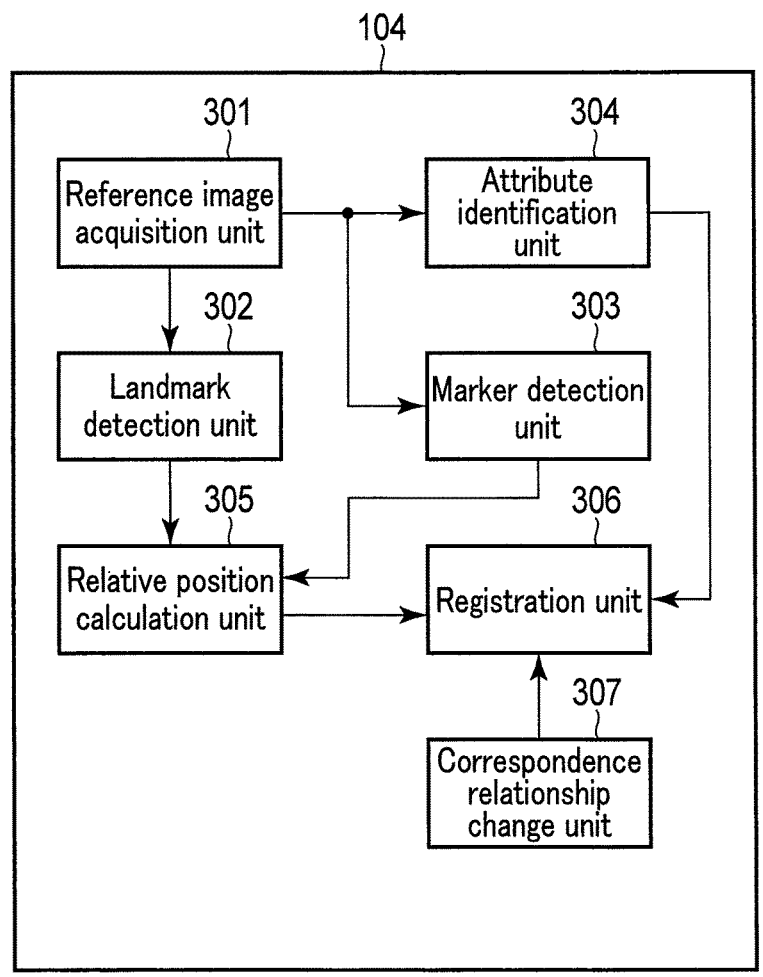
FIG. 3 is a block diagram showing a moving object action registration apparatus shown in FIG. 1.

The moving object action registration apparatus 104 will be described in detail with reference to FIG. 3. In the example illustrated in FIG. 3, the moving object action registration apparatus 104 includes a reference image acquisition unit 301, a landmark detection unit 302, a marker detection unit 303, an attribute identification unit 304, a relative position calculation unit 305, and a registration unit 306.

The reference image acquisition unit 301 acquires at least one reference image from the imaging unit 102. At least one reference image includes a reference image including a marker. In the present embodiment, the reference image acquisition unit 301 acquires a reference image captured by the camera 121 and a reference image including a marker captured by the camera 122.

The landmark detection unit 302 detects a feature point representing a characteristic portion in the environment as a landmark based on at least one reference image acquired by the reference image acquisition unit 301. The characteristic portion in the environment is different from a marker. The characteristic portion in the environment may relate to either a natural object or artificial object. In the present embodiment, the characteristic portion in the environment relates to a structure provided on a ceiling or a pattern of a ceiling. For example, the landmark detection unit 302 extracts a feature point as a landmark from the reference image captured by the camera 121, and calculates a position of the landmark.

A three-dimensional position of the landmark can be calculated based on image coordinates of the landmark in the reference image and a self-position of the camera 121. For example, the three-dimensional position of each of landmarks can be calculated based on a set of image coordinates of the landmark in two images captured by the camera 121 at two different positions according to the principle of triangulation. The position of the landmark in the three-dimensional space is represented by, for example, a combination of coordinates in the three-dimensional space and a quaternion representing rotation. Note that the position and posture may be expressed with any degree of freedom. Further, the position and posture may be described in any expression method. For example, in a case where it can be assumed that movement of the moving object 101 is performed on a plane, such as movement on a floor surface, expression can be made in three degrees of freedom obtained by combining two degrees of freedom for translation and one degree of freedom for rotation. Further, in order to express the posture in the three-dimensional space, a rotation matrix, a vector representing a rotation axis and a rotation direction, an Euler angle, or the like may be used instead of a quaternion.

The self-position of the camera 121 can be estimated using an image processing technique, such as structure from motion (SfM) or simultaneous localization and mapping (SLAM). A plurality of images are acquired by the camera 121 while the moving object 101 is moved, and SfM or SLAM is applied to these images, so that the position and posture of the camera 121 when individual images are acquired can be estimated. Specifically, the self-position can be calculated based on an elementary matrix, a basic matrix or a projective transformation matrix using a set of camera coordinates of landmarks. A set of camera coordinates of landmarks can be obtained by associating landmarks between images. The association can be realized, for example, by using template matching, Lucas-Kanade method, SIFT, or the like. Note that, in this case, in order to obtain an absolute scale, processing, such as normalizing the norm of a translation vector to 1 may be performed, or the scale may be determined by an acceleration sensor or a gyro sensor.

The marker detection unit 303 detects a marker based on the reference image captured by the camera 122. The marker detection unit 303 calculates a position of the marker. As a method of calculating the three-dimensional position of the marker, for example, there is a method in which a marker having a pattern whose three-dimensional coordinates are known is placed in the environment, the marker is captured by the camera 122, and image processing is performed using AR-Toolkit or the like. This method using a marker having a pattern whose three-dimensional coordinates are known enables accurate determination of the self-position of the camera 122. Since the self-position of the moving object 101 and the self-position of the camera 121 can be calculated based on the self-position of the camera 122, the self-position of the moving object 101 and the self-position of the camera 121 can be accurately determined.

In a case where a specific marker is not used, the three-dimensional position of a marker can be calculated based on image coordinates of a feature point on the marker in a reference image and the self-position of the camera 122. The three-dimensional position of the feature point on the marker can be calculated by the principle of triangulation. The position of the feature point in the three-dimensional space is represented by, for example, a combination of coordinates in the three-dimensional space and a quaternion representing rotation. Note that, as described above, the position and posture may be expressed in any degree of freedom, and may be described in any expression method.

In a case where the self-position of the camera 122 is unknown, the self-position of the camera 122 can be calculated by a method similar to that described above in connection with the camera 121. In calculating the self-position of the camera 122, a feature point on a marker is used.

The attribute identification unit 304 identifies the attribute of a marker associated with an action based on the reference image captured by the camera 122. The attribute is expressed, for example, by the orientation, position, pattern, color, shape, identification information (ID), size, blinking, light emission, or the like of the marker. For example, the attribute identification unit 304 identifies which of preset colors a marker is.

The relative position calculation unit 305 calculates a relative position between a landmark and a marker based on a detection result of the landmark by the landmark detection unit 302 and a detection result of the marker by the marker detection unit 303. For example, based on a position of a landmark calculated by the landmark detection unit 302, the relative position calculation unit 305 calculates a first rotation matrix and a first translation matrix which are a rotation matrix and a translation matrix between the moving object 101 and the landmark. Further, based on a position of a marker calculated by the marker detection unit 303, the relative position calculation unit 305 calculates a second rotation matrix and a second translation matrix which are a rotation matrix and a translation matrix between the moving object 101 and the marker. Then, the relative position calculation unit 305 calculates a relative rotation matrix and translation matrix between the landmark and the marker based on the first rotation matrix, the first translation matrix, the second rotation matrix, and the second translation matrix, so as to obtain a relative position between the landmark and the marker.

The registration unit 306 registers, in a database, a reference image (for example, a reference image captured by the camera 121) acquired by the reference image acquisition unit 301, a relative position between a landmark and a marker calculated by the relative position calculation unit 305, and action information based on the attribute identified by the attribute identification unit 304. The action information is information for identifying an action to be performed by a moving object. The action information is, for example, information indicating the attribute identified by the attribute identification unit 304. Alternatively, the action information may be information indicating an action associated with the attribute identified by the attribute identification unit 304. In this case, the registration unit 306 refers to data indicating a correspondence relationship between the attributes and actions with the attribute identified by the attribute identification unit 304, so as to identify an action associated with the identified attribute. The action information may include information indicating a position where the action is to be performed.

The moving object action registration apparatus 104 may further include a correspondence relationship change unit 307. The correspondence relationship change unit 307 changes a correspondence relationship between the attributes and the actions. It is possible to dynamically change the content of an action associated with the attribute.

Next, an operation example of the moving object action registration apparatus 104 will be described.

Figure 4:
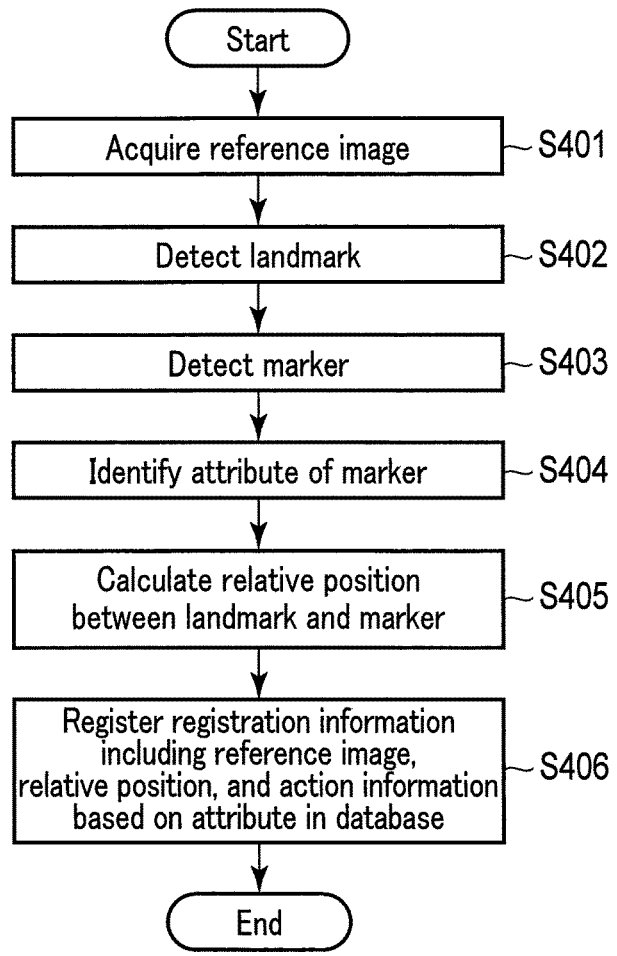
FIG. 4 is a flowchart showing a processing procedure of the moving object action registration apparatus shown in FIG. 4.

FIG. 4 is a flowchart schematically showing an example of the processing procedure of the moving object action registration apparatus 104. In Step S401 in FIG. 4, the reference image acquisition unit 301 acquires, from the imaging unit 102, at least one reference image including a reference image including a marker. For example, the reference image acquisition unit 301 acquires a reference image captured by the camera 121 and a reference image captured by the camera 122. A marker is shown in the reference image captured by the camera 122.

In Step S402, the landmark detection unit 302 detects a landmark based on at least one reference image acquired by the reference image acquisition unit 301. Specifically, the landmark detection unit 302 detects a feature point in the reference image captured by the camera 121 as a landmark, and calculates a position of the landmark.

In Step S403, the marker detection unit 303 detects a marker based on at least one reference image acquired by the reference image acquisition unit 301. Specifically, the marker detection unit 303 calculates a position of the marker based on the reference image captured by the camera 122.

In Step S404, the attribute identification unit 304 identifies the attribute of the marker based on the at least one reference image acquired by the reference image acquisition unit 301. Specifically, the attribute identification unit 304 identifies the attribute of the marker based on the reference image captured by the camera 122.

In Step S405, the relative position calculation unit 305 calculates a relative position between the landmark and the marker. For example, the relative position calculation unit 305 calculates a first rotation matrix and a first translation matrix, which are a rotation matrix and a translation matrix between the moving object 101 and the landmark, based on the position of the landmark calculated by the landmark detection unit 302, and calculates a second rotation matrix and a second translation matrix, which are a rotation matrix and a translation matrix between the moving object 101 and the marker, based on the position of the marker calculated by the marker detection unit 303. The relative position calculation unit 305 calculates a relative rotation matrix and translation matrix between the landmark and the marker based on the first rotation matrix, the first translation matrix, the second rotation matrix, and the second translation matrix.

In Step S406, the registration unit 306 generates registration information including a reference image acquired by the reference image acquisition unit 301, a relative position between a landmark and a marker calculated by the relative position calculation unit 305, and action information based on the attribute identified by the attribute identification unit 304, and registers the registration information in a database.

The above-described processing procedure is merely an example. The processing procedure and the content of each processing can be changed as appropriate. For example, the processing of Step S405 may be performed prior to the processing of Step S404.

As described above, the moving object action registration system 100 acquires reference images captured by the cameras 121 and 122, calculates positions of a landmark and a marker based on the acquired reference images, calculates a relative position between the landmark and the marker based on the calculated positions of the landmark and the marker, identifies the attribute of the marker based on the reference image captured by the camera 122, and generates registration information including the acquired reference image, the calculated relative position, and action information based on the identified attribute. As will be described in a second embodiment, the registration information generated by the moving object action registration system 100 enables estimation of the self-position of the moving object without using a marker, and determination of an action of the moving object. Therefore, the moving object action registration system 100 can generate the registration information that enables estimation of the self-position of the moving object without using a marker and determination of an action of the moving object.

In the example described above, the registration unit 306 generates the registration information including the reference image acquired by the reference image acquisition unit 301. The registration unit 306 may generate registration information including a feature related to a landmark instead of or in addition to the reference image. In this case, the landmark detection unit 302 calculates the feature related to a landmark from a surrounding region of the landmark in the reference image. The surrounding region may be, for example, rectangular region of n-by-m pixels including image coordinates of a landmark as a central position. Here, n and m are unsigned integers. For example, a luminance gradient direction histogram can be used as the feature.

In the example described above, the imaging unit 102 includes the two cameras 121 and 122. The imaging unit 102 may be one camera or may include three or more cameras. For example, the landmark detection unit 302 may detect a landmark based on a reference image including a marker.

Second Embodiment

In the second embodiment, a moving object determination apparatus will be described which determines an action of a moving object capable of estimating the self-position based on an image captured by the imaging device based on the registration information registered by the moving object action registration system 100 according to the first embodiment.

FIG. 5 schematically shows a moving object control device 500 according to the second embodiment. As shown in FIG. 5, the moving object control device 500 controls an action of a moving object 503. The moving object 503 is, for example, a robot including a body, wheels, and a drive mechanism that drives the wheels. The moving object 503 may be the same as or different from the moving object 101 (FIG. 2) described in the first embodiment. The moving object control device 500 is provided inside the body of the moving object 503.

The moving object control device 500 includes a moving object action determination apparatus 501 and a controller 502. The moving object action determination apparatus 501 includes an input image acquisition unit 511, a registered information acquisition unit 512, an estimation unit 513, and an action determination unit 514.

The input image acquisition unit 511 acquires an input image from the imaging unit 504 including at least one imaging device. In the present embodiment, the imaging unit 504 includes a camera 505 as an imaging device, and the input image acquisition unit 511 acquires an image captured by the camera 505 as an input image.

The camera 505 is provided on the moving object 503 to face obliquely upward so as to be able to capture an image including a ceiling. It is assumed that an angle formed by an optical axis of the camera 505 and the ground is known. It is assumed that a height of an optical center of the camera 505 (a distance between the ground and the optical center of the camera 505) is known. The camera 505 may be a monocular camera, a stereo camera, or a fish-eye camera. Further, the image acquired by the camera 505 may be an RGB three-channel image, or may be a one-channel image expressed in grayscale.

The registered information acquisition unit 512 acquires registration information from a database (not shown). The registration information includes a reference image, a first relative position that is a relative position between a landmark and a marker, and action information. The registration information is generated by the moving object action registration system 100 (FIG. 1) described in the first embodiment.

In a case where the database is provided externally, the registered information acquisition unit 512 accesses the database via a communication interface 506 and acquires the registration information from the database. The communication interface 506 includes, for example, a wireless module, such as a wireless LAN module, and wirelessly communicates with an external device. The communication interface 506 may be provided with a terminal, such as a LAN terminal or a USB terminal, instead of the wireless module to perform wired communication with an external device.

The estimation unit 513 estimates a second relative position, which is a relative position between the moving object 503 and a marker, based on the input image acquired by the input image acquisition unit 511 and the reference image and the first relative position included in the registration information acquired by the registered information acquisition unit 512. When an action of the moving object 503 is controlled, it is not necessary to install a marker in the environment. The marker referred to in the second embodiment is a virtual marker, and corresponds to the marker installed when the moving object action registration apparatus 104 (FIG. 1) generates the registration information.

The estimation unit 513 detects, as a landmark, a feature point representing a characteristic portion in the environment based on the reference image included in the registration information acquired by the registered information acquisition unit 512. The estimation unit 513 performs landmark detection by a method similar to that of the landmark detection unit 302 of the moving object action registration apparatus 104. In this manner, the estimation unit 513 detects, as a landmark, the same feature point as that detected by the landmark detection unit 302 as a landmark. Furthermore, the estimation unit 513 extracts candidate points of a landmark from the input image, and calculates a point corresponding to the landmark detected from the reference image among the extracted candidate points, so as to calculate a movement amount from a position (reference position) at which the reference image is captured, and calculate a second relative position based on the calculated movement amount. The corresponding point is calculated by using a method of comparing a feature related to the candidate point of a landmark with a feature related to the landmark detected from the reference image, and setting a candidate point that is close in distance in the feature space as the corresponding point. For example, a luminance gradient direction histogram can be used as the feature.

The action determination unit 514 determines an action of the moving object 503 based on the second relative position estimated by the estimation unit 513 and the action information included in the registration information acquired by the registered information acquisition unit 512. For example, when a distance between the moving object 503 and a marker becomes smaller than a predetermined distance, the action determination unit 514 generates an instruction signal for performing an action designated by the action information. In a case where the action information includes information indicating the attribute, the action determination unit 514 determines an action of the moving object 503 by referring to data indicating a correspondence relationship between the attributes and the actions. In a case where the action information includes information indicating a position where the action is to be performed, the action determination unit 514 generates an instruction signal for performing the action designated by the action information at the position designated by the action information.

The controller 502 controls the moving object 503 based on the action determined by the action determination unit 514.

Next, an operation example of the moving object control device 500 will be described.

Figure 6:
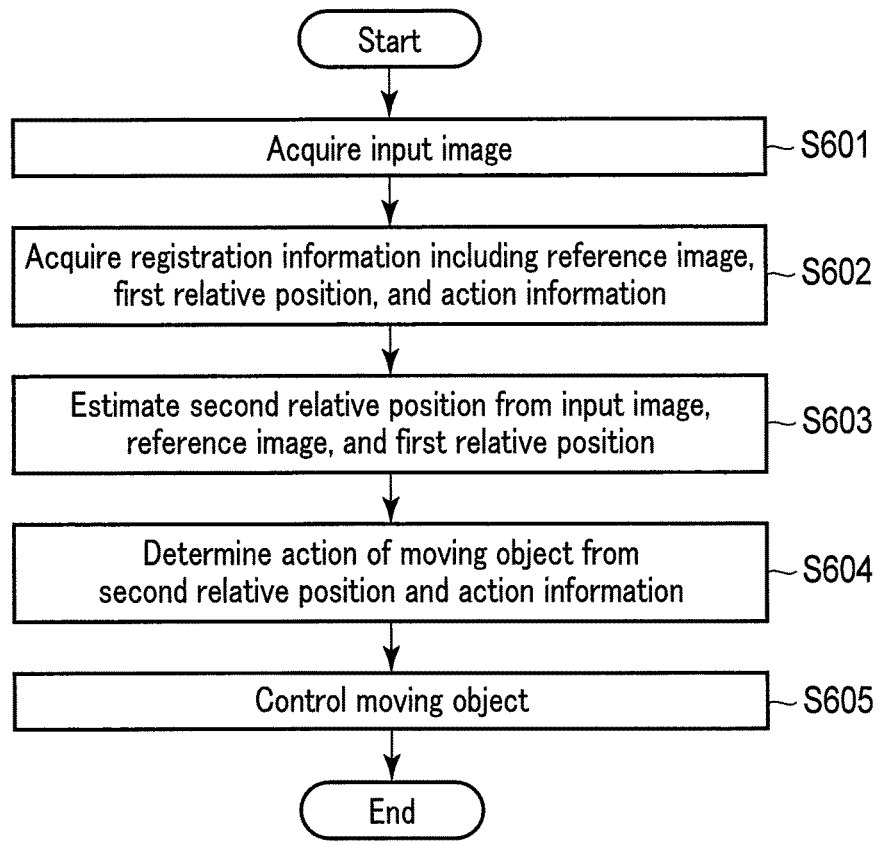
FIG. 6 is a flowchart showing a processing procedure of the moving object control device shown in FIG. 6.

FIG. 6 schematically illustrates an example of the processing procedure of the moving object control device 500. In Step S601 in FIG. 6, the input image acquisition unit 511 acquires an input image from the imaging unit 504. For example, the input image acquisition unit 511 acquires an image captured by the camera 505 as an input image.

In Step S602, the registered information acquisition unit 512 acquires registration information from the database. For example, the registration information includes a reference image, the first relative position which is a relative position between a landmark and a marker, and action information.

In Step S603, the estimation unit 513 estimates the second relative position, which is a relative position between the moving object 503 and a marker, based on the input image acquired by the input image acquisition unit 511 and the reference image and the first relative position included in the registration information acquired by the registered information acquisition unit 512.

In Step S604, the action determination unit 514 determines an action of the moving object 503 based on the second relative position estimated by the estimation unit 513 and the action information included in the registration information acquired by the registered information acquisition unit 512.

In Step S605, the controller 502 controls the moving object 503 to perform the action determined by the action determination unit 514.

In this manner, the moving object control device 500 moves the moving object 503 to a target point while causing the moving object 503 to perform a predetermined action.

As described above, the moving object control device 500 according to the second embodiment acquires the input image captured by the imaging device from the imaging unit, acquires the registration information including the reference image, the first relative position, which is a relative position between a landmark and a marker, and action information from the database, estimates the second relative position, which is a relative position between the moving object 503 and the marker, based on the input image and the first relative position, and determines an action of the moving object based on the second relative position and the action information. By estimating the second relative position based on the reference image and the first relative position included in the input image and the registration information, it is possible to accurately calculate the self-position of the moving object 503 without using a marker. As a result, the moving object 503 can be successfully moved to the target point. Furthermore, by using the action information included in the registration information, the moving object 503 can be caused to perform a predetermined action.

Third Embodiment

In a third embodiment, a case where the moving object action registration apparatus generates registration information at a plurality of points. In this case, a plurality of markers are arranged along a path from a departure point to a target point.

Figure 7:
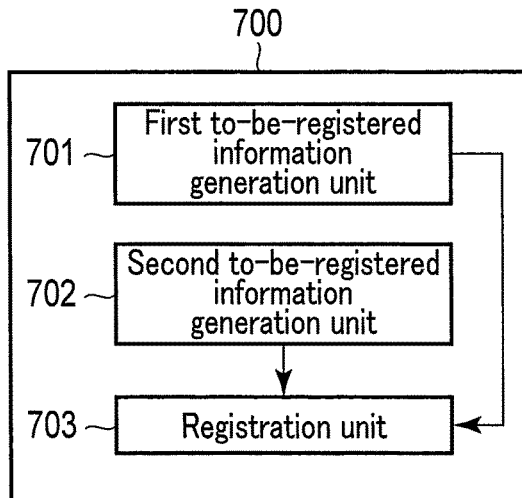
FIG. 7 is a block diagram showing a moving object action registration apparatus according to a third embodiment.

FIG. 7 schematically shows a moving object action registration apparatus 700 according to the third embodiment. The moving object action registration system according to the third embodiment may be one obtained by replacing the moving object action registration apparatus 104 with the moving object action registration apparatus 700 in the moving object action registration system 100 shown in FIG. 1.

In an example illustrated in FIG. 7, the moving object action registration apparatus 700 includes a first to-be-registered information generation unit 701 and a second to-be-registered information generation unit 702 in order to generate registration information at two points. The first to-be-registered information generation unit 701 and the second to-be-registered information generation unit 702 each perform processing similar to that of the reference image acquisition unit 301, the landmark detection unit 302, the marker detection unit 303, the attribute identification unit 304, and the relative position calculation unit 305 shown in FIG. 3. Therefore, the description of the first to-be-registered information generation unit 701 and the second to-be-registered information generation unit 702 will be appropriately omitted. The moving object action registration apparatus 700 further includes a registration unit 703.

The first to-be-registered information generation unit 701 acquires, from the imaging unit 102, a first reference image captured at a first reference position (for example, a position before the start of movement of the moving object 101). For example, the first to-be-registered information generation unit 701 acquires an image captured by the camera 121 and the camera 122 at the first reference position as the first reference image. The first reference image by the camera 122 includes a first marker. The first to-be-registered information generation unit 701 detects a feature point in the first reference image by the camera 121 as a first landmark. The first to-be-registered information generation unit 701 detects the first marker and its attribute based on the first reference image by the camera 122. The first to-be-registered information generation unit 701 calculates a first relative position, which is a relative position between the first landmark and the first marker, based on a detection result of the first landmark and a detection result of the first marker. The first to-be-registered information generation unit 701 generates first registration information including the first reference image by the camera 121, the first relative position, and the action information based on the attribute of the first marker. The first registration information is, for example, labeled with information indicating that it is before the start of movement of the moving object 101.

The second to-be-registered information generation unit 702 acquires, from the imaging unit 102, a second reference image captured at a second reference position (for example, any position during movement of the moving object 101). For example, the second to-be-registered information generation unit 702 acquires an image captured by the camera 121 and the camera 122 at the second reference position as a second reference image. The second reference image by the camera 122 includes a second marker different from the first marker. The second to-be-registered information generation unit 702 detects a feature point in the second reference image by the camera 121 as a second landmark. The second to-be-registered information generation unit 702 detects the second marker and its attribute based on the second reference image by the camera 122. The second to-be-registered information generation unit 702 determines a second relative position, which is a relative position between the second landmark and the second marker, based on a detection result of the second landmark and a detection result of the second marker. The second to-be-registered information generation unit 702 generates second registration information including the second reference image by the camera 121, the second relative position, and the action information based on the attribute of the second marker. The second registration information is, for example, labeled with information indicating that the moving object 101 is moving.

The registration unit 703 registers the first registration information generated by the first to-be-registered information generation unit 701 and the second registration information generated by the second to-be-registered information generation unit 702 in the database.

Next, an operation example of the moving object action registration apparatus 700 will be described.

Figure 8:
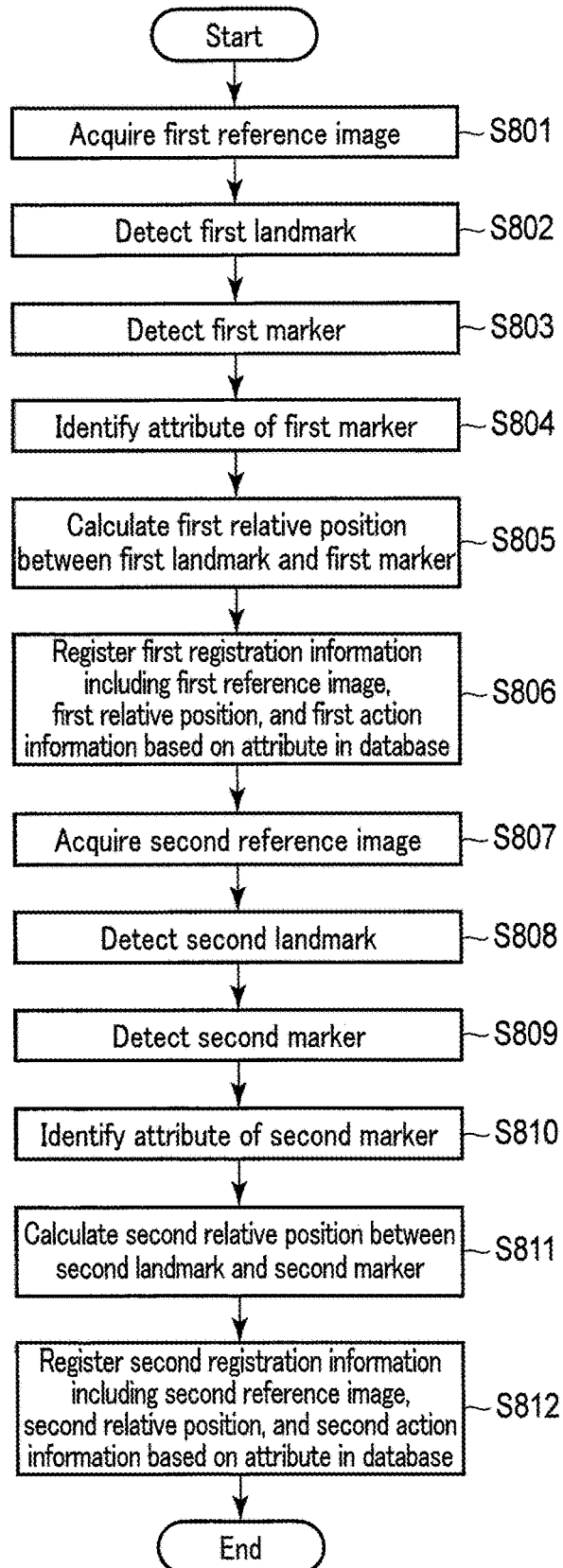
FIG. 8 is a flow chart showing a processing procedure of the moving object action registration apparatus shown in FIG. 7.

FIG. 8 schematically illustrates an example of the processing procedure of the moving object action registration apparatus 700. In Step S801 in FIG. 8, the first to-be-registered information generation unit 701 acquires, from the imaging unit 102, the first reference image captured by the cameras 121 and 122 when the moving object 101 is at the first reference position.

In Step S802, the first to-be-registered information generation unit 701 detects the first landmark based on the first reference image by the camera 121. For example, the first to-be-registered information generation unit 701 detects a feature point in the first reference image by the camera 121 as the first landmark, and calculates a position of the first landmark. In Step S803, the first to-be-registered information generation unit 701 detects the first marker based on the first reference image by the camera 122. For example, the first to-be-registered information generation unit 701 calculates a position of the first marker based on the first reference image by the camera 122. In Step S804, the first to-be-registered information generation unit 701 identifies the attribute of the first marker based on the first reference image by the camera 122. In Step S805, the first to-be-registered information generation unit 701 calculates the first relative position, which is a relative position between the first landmark and the first marker, based on a detection result of the first landmark and a detection result of the first marker.

In Step S806, the registration unit 703 generates the first registration information including the first reference image by the camera 121, the first relative position, and the action information based on the attribute of the first marker, and registers the generated first registration information in the database.

In Step S807, the second to-be-registered information generation unit 702 acquires, from the imaging unit 102, the second reference image captured by the cameras 121 and 122 when the moving object 101 is at the second reference position different from the first reference position.

In Step S808, the second to-be-registered information generation unit 702 detects a second landmark based on the second reference image by the camera 121. For example, the second to-be-registered information generation unit 702 detects a feature point in the second reference image by the camera 121 as a second landmark, and calculates a position of the second landmark. In Step S809, the second to-be-registered information generation unit 702 detects a second marker based on the second reference image by the camera 122. For example, the second to-be-registered information generation unit 702 calculates a position of the second marker based on the second reference image by the camera 122. In Step S810, the second to-be-registered information generation unit 702 identifies the attribute of the second marker based on the second reference image by the camera 122. In Step S811, the second to-be-registered information generation unit 702 calculates the second relative position, which is a relative position between the second landmark and the second marker, based on a detection result of the second landmark and a detection result of the second marker.

In Step S812, the registration unit 703 generates the second registration information including the second reference image by the camera 121, the second relative position, and the action information based on the attribute of the second marker, and registers the generated second registration information in the database.

In this manner, the moving object action registration apparatus 700 generates registration information at a plurality of points, and registers the generated registration information in the database. For example, in a case where a moving object moves from a wide passage to a narrow passage, the second marker is installed near the entrance of the narrow passage. The registration information generated as a result allows the moving object to successfully move from the wide passage to the narrow passage without the use of a marker.

Fourth Embodiment

In the fourth embodiment, a moving object control device will be described which controls an action of a moving object based on the registration information generated by the moving object action registration apparatus 700 according to the third embodiment.

Figure 9:
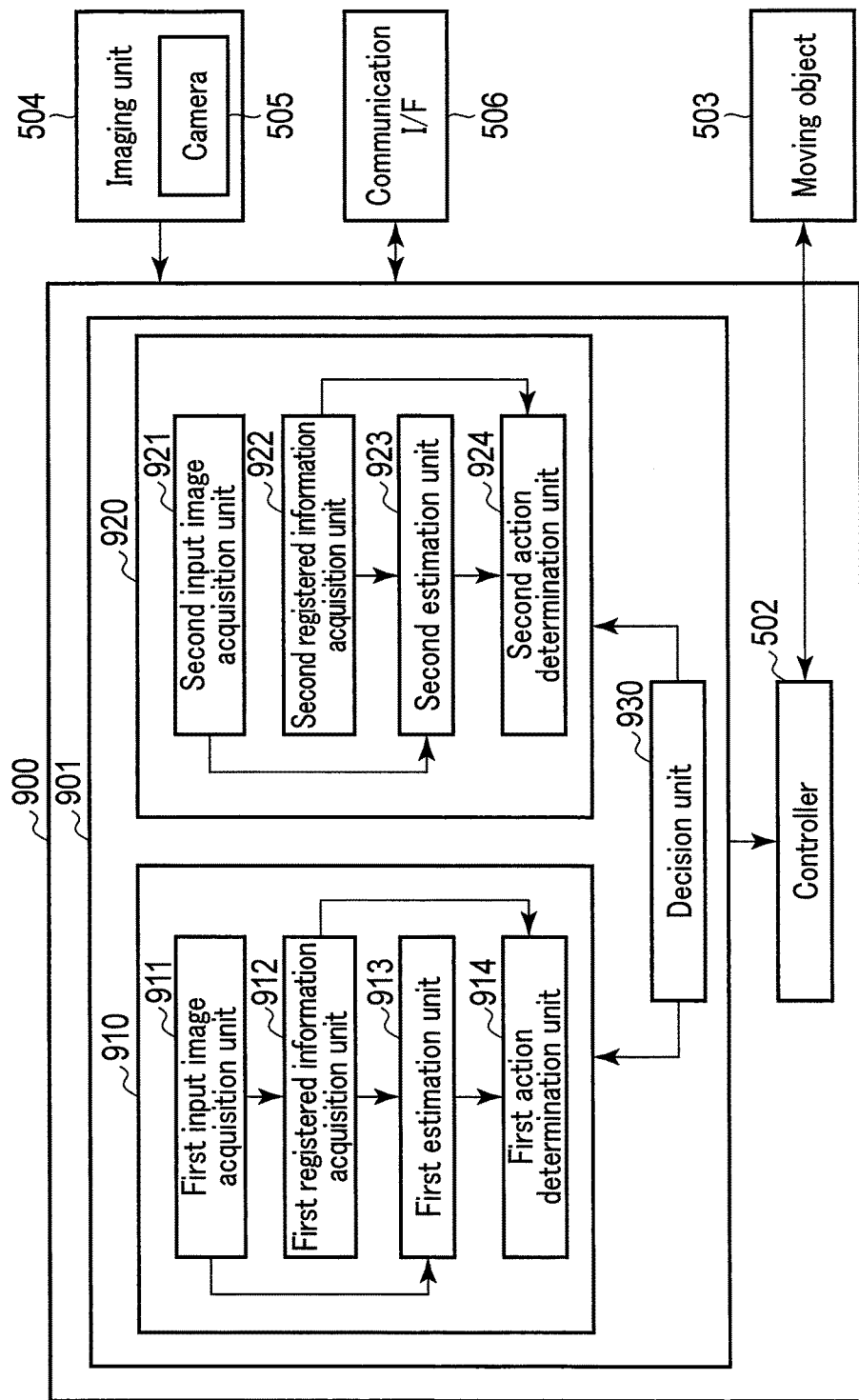
FIG. 9 is a block diagram showing a moving object control device according to a fourth embodiment.

FIG. 9 schematically shows a moving object control device 900 according to the fourth embodiment. In FIG. 9, parts similar to those shown in FIG. 5 are denoted by similar reference numerals, and the description of such parts will be omitted.

As shown in FIG. 9, the moving object control device 900 includes a moving object action determination apparatus 901 and the controller 502. The moving object action determination apparatus 901 includes a first action instruction generation unit 910, a second action instruction generation unit 920, and a decision unit 930. The first action instruction generation unit 910 includes a first input image acquisition unit 911, a first registered information acquisition unit 912, a first estimation unit 913, and a first action determination unit 914. The second action instruction generation unit 920 includes a second input image acquisition unit 921, a second registered information acquisition unit 922, a second estimation unit 923, and a second action determination unit 924. The first input image acquisition unit 911, the first registered information acquisition unit 912, the first estimation unit 913, and the first action determination unit 914 respectively perform processing similar to that of the input image acquisition unit 511, the registered information acquisition unit 512, the estimation unit 513, and the action determination unit 514 shown in FIG. 5. The second input image acquisition unit 921, the second registered information acquisition unit 922, the second estimation unit 923, and the second action determination unit 924 respectively perform processing similar to that of the input image acquisition unit 511, the registered information acquisition unit 512, the estimation unit 513, and the action determination unit 514 shown in FIG. 5. For this reason, description regarding the first input image acquisition unit 911, the first registered information acquisition unit 912, the first estimation unit 913, the first action determination unit 914, the second input image acquisition unit 921, the second registered information acquisition unit 922, the second estimation unit 923, and the second action determination unit 924 will be appropriately omitted.

The first input image acquisition unit 911 acquires an image captured by the camera 505 as a first input image from the imaging unit 504.

The first registered information acquisition unit 912 acquires the first registration information from a database (not shown). The first registration information may be generated by the first to-be-registered information generation unit 701 described in the third embodiment. The first registration information includes the first reference image, a relative position between the first landmark and the first marker, and first action information.

The first estimation unit 913 estimates a third relative position, which is a relative position between the moving object 503 and the first marker, based on the first input image acquired by the first input image acquisition unit 911 and the first reference image and the first relative position included in the first registration information acquired by the first registered information acquisition unit 912.

The first action determination unit 914 determines an action of the moving object 503 based on the third relative position estimated by the first estimation unit 913 and the first action information included in the first registration information.

The second input image acquisition unit 921 acquires an image captured by the camera 505 as a second input image from the imaging unit 504.

The second registered information acquisition unit 922 acquires the second registration information from the database. The second registration information may be generated by the second to-be-registered information generation unit 702 described in the third embodiment. The second registration information includes the second reference image, a relative position between the second landmark and the second marker, and the second action information.

The second estimation unit 923 estimates a fourth relative position, which is a relative position between the moving object 503 and the second marker, based on the second input image acquired by the second input image acquisition unit 921 and the second reference image and the second relative position included in the second registration information acquired by the second registered information acquisition unit 922.

The second action determination unit 924 determines an action of the moving object 503 based on the fourth relative position estimated by the second estimation unit 923 and the second action information included in the second registration information.

The decision unit 930 determines which of the first action instruction generation unit 910 or the second action instruction generation unit 920 is to be used based on a position of the moving object 503. Specifically, in a case where the moving object 503 is in an area corresponding to the first registration information, the decision unit 930 determines to use the first action instruction generation unit 910, and, in a case where the moving object 503 is in an area corresponding to the second registration information, the decision unit 930 determines to use the second action instruction generation unit 920. As an example, the decision unit 930 determines to use the first action instruction generation unit 910 in a case where a distance between the moving object 503 and the target point exceeds a predetermined distance, and determines to use the second action instruction generation unit 920 otherwise.

The controller 502 controls operation of the moving object 503 based on an action instruction generated by either the first action instruction generation unit 910 or the second action instruction generation unit 920 according to the position of the moving object 503.

Next, an operation example of the moving object control device 900 will be described.

FIG. 10 schematically illustrates an example of the processing procedure of the moving object control device 900. In Step S1001 in FIG. 10, the first input image acquisition unit 911 acquires the first input image captured by the camera 505 from the imaging unit 504. In Step S1002, the first registered information acquisition unit 912 acquires the first registration information from the database. In Step S1003, the first estimation unit 913 estimates the third relative position, which is a relative position between the first landmark and the first marker, based on the first input image and the first reference image and the first relative position included in the first registration information. In Step S1004, the first action determination unit 914 determines an action of the moving object 503 based on the action information included in the first registration information and the third relative position estimated by the first estimation unit 913. In Step S1005, the controller 502 controls the moving object 503 to perform the action determined by the first action determination unit 914.

In Step S1006, the decision unit 930 determines whether or not the moving object 503 is in an area corresponding to the second registration information. When the moving object 503 is not in the area corresponding to the second registration information (Step S1006; No), Steps S1001, S1003, S1004, and S1005 are repeated.

When the moving object 503 is in the area corresponding to the second registration information (Step S1006; Yes), the second input image acquisition unit 921 acquires the second input image captured by the camera 505 from the imaging unit 504 in Step S1007. In Step S1008, the second registered information acquisition unit 922 acquires the second registration information from the database. In Step S1009, the second estimation unit 923 estimates the fourth relative position, which is a relative position between the second landmark and the second marker, based on the second input image and the second reference image and the second relative position included in the second registration information. In Step S1010, the second action determination unit 924 determines an action of the moving object 503 based on the action information included in the second registration information and the fourth relative position estimated by the second estimation unit 923. In Step S1011, the controller 502 controls the moving object 503 to perform the action determined by the second action determination unit 924.

In this manner, the moving object control device 900 moves the moving object 503 to the target point while causing the moving object 503 to perform a predetermined action. At the time of operation of the moving object 503, it is not necessary to set a marker.

FIG. 11 schematically illustrates an example of a hardware configuration of a data processing device 1100 according to an embodiment. The data processing device 1100 shown in FIG. 11 corresponds to the moving object action registration apparatus 104 (FIG. 3) according to the first embodiment, the moving object control device 500 (FIG. 5) according to the second embodiment, the moving object action registration apparatus 700 (FIG. 7) according to the third embodiment, or the moving object control device 900 (FIG. 9) according to the fourth embodiment.

The data processing device 1100 includes a central processing unit (CPU) 1101, a main storage device 1102, an auxiliary storage device 1103, an input device 1104, and a display device 1105, which are connected to one another by a bus 1106.

The CPU 1101 is an example of a general-purpose processor. The main storage device 1102 is a volatile memory, such as a synchronous dynamic random access memory (SDRAM), and is used by the CPU 1101 as a working memory. The auxiliary storage device 1103 is a non-volatile memory, such as a hard disk drive (HDD) or a solid state drive (SSD), and stores a program, such as a moving object action registration program or a moving object control program, data necessary for executing a program, data which shows a correspondence relationship between attributes and an action, and the like.

In a case where the data processing device 1100 is used as the moving object action registration apparatus 104, the above-described functions of the moving object action registration apparatus 104, for example, processing by the reference image acquisition unit 301, the landmark detection unit 302, the marker detection unit 303, the attribute identification unit 304, the relative position calculation unit 305, the registration unit 306, and the correspondence relationship change unit 307 is realized by the CPU 1101 executing a moving object action registration program. That is, the CPU 1101 is configured to perform the above-described processing in connection with the reference image acquisition unit 301, the landmark detection unit 302, the marker detection unit 303, the attribute identification unit 304, the relative position calculation unit 305, the registration unit 306, and the correspondence relationship change unit 307 according to the moving object action registration program.

In a case where the data processing device 1100 is used as the moving object control device 500, the above-described functions of the moving object control device 500, for example, processing by the input image acquisition unit 511, the registered information acquisition unit 512, the estimation unit 513, the action determination unit 514, and the controller 502 is realized by the CPU 1101 executing the moving object control program.

When the data processing device 1100 is used as the moving object action registration apparatus 700, the above-described functions of the moving object action registration apparatus 700, for example, processing by the first to-be-registered information generation unit 701 and the second to-be-registered information generation unit 702 is realized by the CPU 1101 executing the moving object action registration program.

When the data processing device 1100 is used as the moving object control device 900, the above-described functions of the moving object control device 900, for example, processing by the first input image acquisition unit 911, the first registered information acquisition unit 912, the first estimation unit 913, the first action determination unit 914, the second input image acquisition unit 921, the second registered information acquisition unit 922, the second estimation unit 923, the second action determination unit 924, the decision unit 930, and the controller 502 is realized by the CPU 1101 executing the moving object control program.

Note that part or all of the functions of each apparatus may be realized by a dedicated processor, such as an application specific integrated circuit (ASIC) or a field programmable gate array (FPGA). The term hardware processor or processing circuitry includes a general-purpose processor, a dedicated processor, or a combination of a general-purpose processor and a dedicated processor.

The input apparatus 1104 includes, for example, a keyboard and a mouse. The display apparatus 1105 may be, for example, a liquid crystal display (LCD) or an organic light emitting diode (OLED) display.

The instructions shown in the processing procedure shown in the above embodiments can be executed based on a program that is software. A general-purpose computer system stores this program in advance and reads this program, so that it is possible to obtain an effect similar to that obtained by the above-mentioned effect by the moving object action registration apparatus or moving object control device. The instructions described in the above-described embodiments, as programs that can be executed by a computer, are recorded in a magnetic disk (flexible disk, hard disk, or the like), an optical disk (CD-ROM, CD-R, CD-RW, DVD-ROM, DVD±R, DVD±RW, or the like), a semiconductor memory, or a recording medium similar to the above. The storage format of the storage medium may be any form, as long as the storage medium is readable by a computer or an embedded system. If a computer reads a program from the recording medium and causes the CPU to execute an instruction described in the program based on the program, the computer can realize operation similar to that of the moving object action registration apparatus or the moving object control device according to the above-described embodiments. As a matter of course, in a case where the computer acquires or reads a program, the computer may acquire or read the program through a network.

Further, an operating system (OS) running on a computer based on instructions of a program installed in a computer or an embedded system from a recording medium, a database management software, middleware (MW) such as a network, and the like may execute part of the processing for realizing the present embodiment.

Furthermore, the recording medium in the present embodiment is not limited to a medium independent of a computer or an embedded system, and includes a recording medium that stores or temporarily stores a downloaded program transmitted by a LAN, the Internet, or the like.

Further, the recording medium is not limited to one, and even in a case where processing in the present embodiment is executed from a plurality of media, the media are included in the recording medium in the present embodiment, and the configuration of the media may be any configuration.

Note that the computer or the embedded system in the present embodiment is for executing each processing in the present embodiment based on the program stored in the recording medium, and may have a configuration of any of an apparatus including one of a personal computer, microcomputer, and the like, a system in which a plurality of apparatuses are connected via a network.

Further, the computer in the present embodiment is not limited to a personal computer, but includes an arithmetic processing unit, a microcomputer, and the like included in a data processing device, and generically refers to apparatuses and devices capable of realizing the functions in the present embodiment by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A moving object action registration apparatus comprising:
   one or more processors configured to implement a reference image receiver, a landmark detector, a marker detector, a relative position calculator, an attribute identifier, and a registration unit, wherein
      the reference image receiver acquires a first reference image and a second reference image from an imaging unit, the second reference image including a marker, the first reference image being different from the second reference image;
      the landmark detector detects, as a landmark, a feature point indicating a characteristic portion in an environment based on the first reference image;
      the marker detector detects the marker based on the second reference image;
      the relative position calculator calculates a relative position between the landmark and the marker based on a detection result of the landmark and a detection result of the marker;
      the attribute identifier identifies an attribute of the marker associated with an action based on the second reference image; and
      the registration unit registers registration information in a database, the registration information including the relative position, action information being based on the attribute, and at least one of the first reference image or a feature related to the landmark, the feature being calculated from the first reference image.

2. The apparatus according to claim 1, wherein the registration information further includes at least one reference image.

3. The apparatus according to claim 1, wherein the landmark detector calculates a feature related to the landmark, and
   the registration information further includes the feature.

4. The apparatus according to claim 1, wherein the relative position calculator calculates a relative three-dimensional position between the landmark and the marker as the relative position.

5. The apparatus according to claim 1, wherein the attribute includes at least one of an orientation, a position, a pattern, a color, a shape, identification information, size, blinking, and light emission of the marker.

6. The apparatus according to claim 1, further comprising a correspondence relationship change unit that changes a correspondence relationship between attributes and actions, wherein
   the registration unit generates the action information based on the identified attribute and the correspondence relationship between the attributes and the actions.

7. A moving object action registration system comprising:
   a moving object;
   a controller that controls movement of the moving object;
   a reference image receiver that acquires a first reference image and a second reference image from an imaging unit provided at the moving object, the second reference image including a marker, the first reference image being different from the second reference image;
   a landmark detector that detects, as a landmark, a feature point indicating a characteristic portion in an environment based on the first reference image;
   a marker detector that detects the marker based on the second reference image;
   a relative position calculator that calculates a relative position between the landmark and the marker based on a detection result of the landmark and a detection result of the marker;
   an attribute identifier that identifies an attribute of the marker associated with an action based on the second reference image; and
   a registration unit that registers registration information in a database, the registration information including the relative position, action information being based on the attribute, and at least one of the first reference image or a feature related to the landmark, the feature being calculated from the first reference image.

8. A moving object action determination apparatus comprising:
   one or more processors configured to implement an input image receiver, a registered information receiver, a estimation unit, and an action determination unit, wherein
   the input image receiver that acquires an input image from an imaging unit provided at a moving object;
   the registered information receiver that acquires registration information, the registration information including a first relative position, which is a relative position between a landmark and a marker, action information being based on an attribute of the marker, and at least one of a reference image including the landmark or a feature related to the landmark, the feature being calculated from the reference image;
   the estimation unit that estimates a second relative position, which is a relative position between the moving object and the marker, based on the input image, the first relative position included in the registration information, and the at least one of the reference image or the feature including the registration information; and the action determination unit that determines an action of the moving object based on the second relative position and the action information included in the registration information.

9. The apparatus according to claim 8, wherein the input image does not include the marker.

10. The apparatus according to claim 8, wherein the action includes at least one of an orientation, a movement direction, a velocity, and an instruction to a mechanism mounted on the moving object.

* * * * *